UNITED STATES PATENT OFFICE.

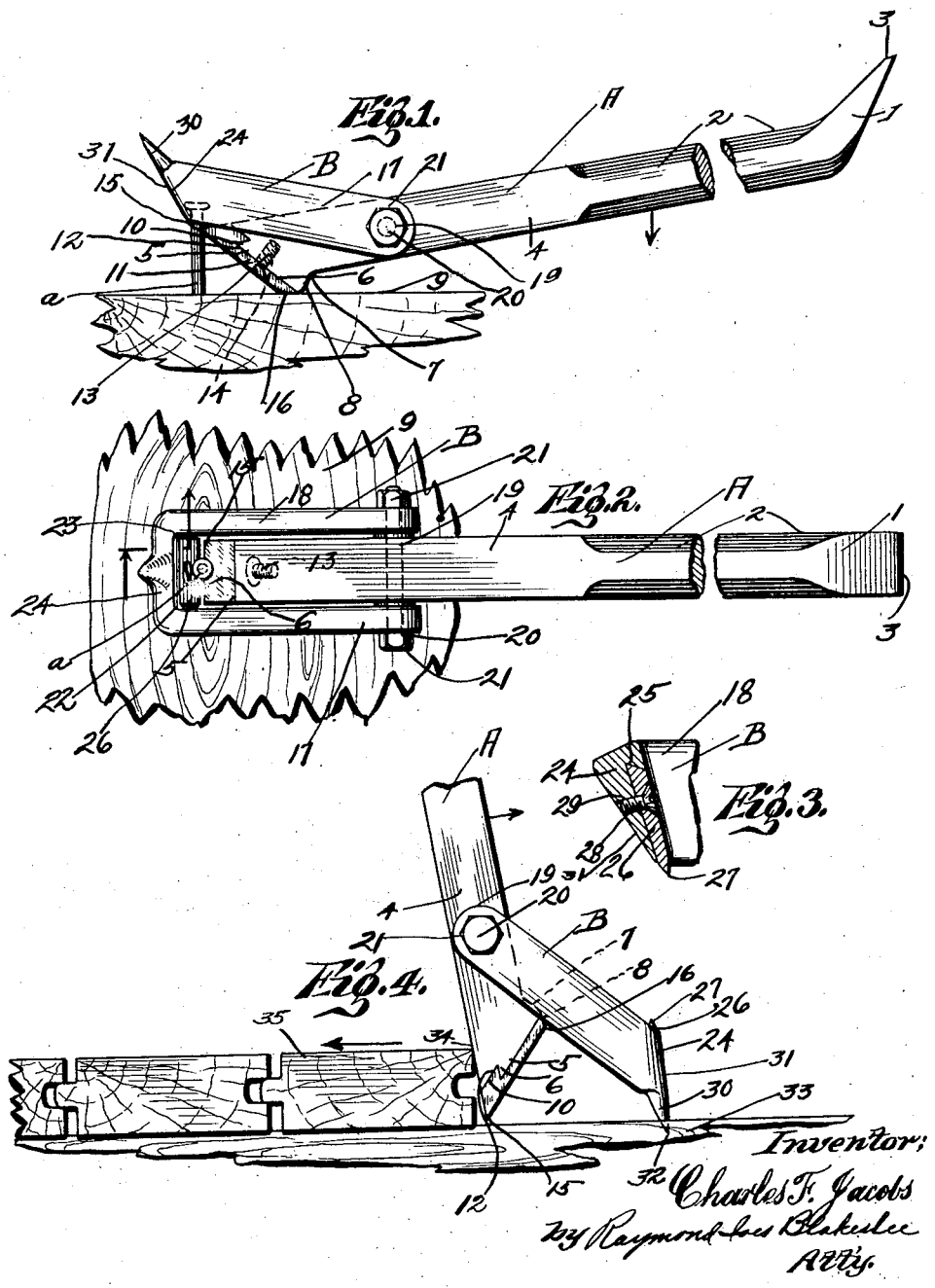

CHARLES F. JACOBS, OF YORBA LINDA, CALIFORNIA, ASSIGNOR OF ONE-HALF TO FRED W. CONKEY, OF HUNTINGTON BEACH, CALIFORNIA.

TOOL OR IMPLEMENT.

1,412,348.  Specification of Letters Patent.  Patented Apr. 11, 1922.

Application filed February 14, 1921. Serial No. 444,765.

*To all whom it may concern:*

Be it known that I, CHARLES F. JACOBS, a citizen of the United States, residing at Yorba Linda, in the county of Orange and State of California, have invented new and useful Improvements in Tools or Implements, of which the following is a specification.

This invention relates to a tool or implement adapted for various uses, as will more fully appear.

The invention has for an object the provision of a tool or implement which combines certain novel and useful members for the accomplishing of various results and which will be capable of use for a wide range of purposes, and as a general handy tool and implement, among such purposes and uses being the speedy and easy removal of nails, spikes, tacks and other securing devices, and the moving and manipulating of timbers, planking and other objects and articles.

In practising the invention I provide a handle, which handle may be of the crowbar type, having at one end thereof a sharpened tempered edge, or preferably provided with an independent plate member, properly tempered and detachably associated with an end of said handle, and a yoke, or stirrup, or pivoted dog member. The plate member is sharpened at an edge thereof and likewise the said plate member is inclined at an angle to the end of the crowbar handle. The pivoted dog and the crowbar handle are joined to each other, so that the pivoted dog straddles opposite sides of the handle member. This arrangement forms two relatively movable members. The pivoted dog may include two spaced parallel members straddling opposite sides of the handle member and pivotally joined by means of a bolt to said handle member, and which parallel members are joined by means of a transverse member. The transverse member carries a tempered plate member provided with a sharp edge portion which is adapted to co-operate with the sharp edge portion of the plate member joined to the end of the handle member. Opposite the sharp edge portion of the plate member there is a spur or point joined with the transverse member. Thus, if it were desired to remove a spike or nail, the two relatively movable members would be thrown into an open position, so that the sharp edge portions might engage the head portion of the nail or spike or tack, or any member it was desired to remove from some object, and a movement of said handle member would tend to draw the relatively movable members toward one another, so that the nail or spike or tack, or other object, would be drawn directly upward without a bending thereof. We will term this relation a positive relation. If now we throw the pivoted dog into what will be termed a negative position, so that the two sharpened edges, that is to say, the sharpened edge on the end of the handle and the sharpened edge on the transverse portion of the stirrup or pivoted dog member, are on the same side of the center line of the handle the spur or point will be so arranged that it may engage an object. When this occurs the handle and pivoted dog may so co-operate with each other that the tool may be advanced step by step, the spur member digging into an object, while the handle member, upon being oscillated back and forth, will tend to advance an object ahead of it.

The invention has for further objects the provision of an improved device of the character mentioned, which will be superior in point of relative simplicity and inexpensiveness, taken in conjunction with utility, durability, and general efficiency and serviceability.

With the above-mentioned and other objects in view, the invention consists in the novel and useful provision, formation, construction, combination, association, and inter-relation of parts, members and features, as illustrated in some of its embodiments in the accompanying drawing, described in the following detailed description, and finally pointed out in claims.

In the drawing:

Figure 1 is a fragmentary side elevation of the improved tool or implement and shown removing a nail from an object.

Figure 2 is a fragmentary top plan view of the tool or implement shown in Figure 1.

Figure 3 is a fragmentary detail of certain means used in practising the invention and taken on the line 3—3 of Figure 2 and looking in the direction of the appended arrows.

Figure 4 is a fragmentary view showing a particular use to which the implement may be put.

Corresponding parts in all the figures are designated by the same reference characters.

Referring with particularity to the drawing, A designates the handle, B the pivoted dog, said members A and B providing two relatively movable members and providing the means for accomplishing a variety of results and useful purposes, both of said elements A and B being utilized in the practising of one embodiment of the invention.

The handle member A may be in the form of a crowbar handle, that is to say, one end, as 1, of the same is disposed at an angle to the body of the handle 2 and sharpened, as 3. This is of the ordinary crowbar form. In the drawing the figures show that a portion of the handle 2 is squared at 4, and that the foot of the handle 2, as at 5, is at an angle, as 6, to the faces forming the squared portion 4. One face, as 7, is provided with an outwardly extending projection or toe, 8, to form a point about which the handle may be pivoted when the handle 2 is rocked about the toe 8, when the toe 8 is resting on some object, as 9. If desired, the end, as 5, of the handle 2 may be so cut, as illustrated at 10, as to accommodate a member 11 correspondingly formed in zig-zag formation as at 12, to fit within the zig-zag cut portion 10 of the end 5 of the handle 2, this causing the member 11 to dovetail with the end 5. A screw, 13, may pass through a counter-sunk perforation in the member 11 and have a screw-threaded engagement with a perforation in the handle 2, as illustrated at 14. In this manner the member 11 is rigidly maintained in position at the end 5 of the handle 2, and the dove-tail formation aids in the rigidity of the entire structure. The handle member 2 is preferably made of wrought iron and the plate member 11 is preferably formed of tempered steel with an edge of the same, as 15, sharpened. The end opposite the sharpened edge 15, as 16, is rounded so as to co-operate in general formation with the toe portion 8 of the handle 2. The pivoted dog member B may comprise two spaced members, 17 and 18, pivotally joined to the handle member A as at 19, by means of a bolt, 20, passing through aligned perforations in the members 17 and 18, and the handle member 2; said bolt being maintained in position by means of nuts 21 on opposite ends of said bolt 20. Said members 17 and 18 are joined together at an end, as 22 and 23, by means of a transverse member 24. The transverse member is dovetailed on its inner surface, as at 25, to accommodate a tempered sharp edge plate 26 for accommodation in the dovetailed portion 25. The sharp edge portion of said plate 26, designated as 27, is adapted to co-operate with the sharp edge portion 15 of the plate 11 in practising one embodiment of the invention. The plate 26 may conveniently be maintained within the dovetailed portion 25 by means of a screw, 28, passing through a counter-sunk perforation in the plate 26 and have a screw-threaded engagement with a perforation in the transverse member 24, as illustrated at 29. Opposite the sharp edge portion 27 of the plate 26, and at a median portion of the transverse member 24, is a projecting point or spur 30. The projecting point or spur is adapted to co-operate with the handle member 2 in practising certain embodiments of the invention.

The operation is as follows:

Referring to Figure 1 it is to be noted that the end 5 and the plate member 11 carried on the end 5, are at an angle with relation to the sides of the handle 2 and particularly the squared faces 4; also that the transverse member 24 of the means B is correspondingly angled, as shown at 31. Thus, when the two relatively movable members are moved it will be seen in the figure that the sharp edge portions 27 and 15 of the plate members 26 and 11 respectively, just pass one another. Hence, if the sharp edge portions engage a nail a, shown in Figures 1 and 2, the member B will tend to remain at a definite position, while the handle member A is moving downwardly, say in the direction of the arrow appended thereto in Figure 1, and cause the nail a to be drawn directly upwardly without a bending of the same, and out of the object 9, in which it was imbedded. Furthermore, it will be observed that the handle member A oscillates upon the curved toe, 8, of the handle member.

Referring to Figure 4, the means B has revolved past the sharpened edge 15, so that it now has the spur member 30 ready for engagement with an object. When this occurs the spur member 30 may imbed itself, as shown at 32, in an object 33, and a face, as 34, of the handle A may engage some object, so that by revolving the handle A in the direction of the arrow appended in said figure, an object, as 35, may be advanced in the direction of the arrow above said object 35. An oscillation of the handle member A back and forth will cause the handle member and the dog member to be alternately presented so as to advance the implement step by step.

The relatively movable member B of course does not necessarily require the two members 17 and 18, as one member, as 17, provided with the member 24, might be sufficient. Furthermore, instead of providing tempered plate members as 11 and 26, the transverse member 24, as well as the foot portion of the handle 2, might be tempered, this being a matter of preference and convenience.

As shown in Figure 4, the invention is particularly adaptable for use in closing the gaps between flooring, without in any manner injuring the flooring.

It is obvious that many changes and variations and modifications may be made in departure from the particular description and showing of the accompanying drawing, in adapting the invention to varying conditions and requirements of use and service, without departing from the true spirit of the invention.

What I claim and desire to secure by Letters Patent is:

1. A device of the character described, comprising two relatively movable members, one of said movable members being a handle provided with a foot and the other of said movable members being a pivoted dog carried by said handle and adapted to co-operate with the foot; said relatively movable members being adapted to be swung into a position so that the foot and dog are alternately presented to advance the tool step by step.

2. A device of the character described, comprising two relatively movable members, one of said movable members being a handle provided with a foot and the other of said movable members being a pivoted dog carried by said handle and adapted to co-operate with the foot; said pivoted dog comprising a member formed with an angularly directed portion, said angularly directed portion being adapted to co-operate with the foot of the handle; said foot of the handle being provided with a sharp edge member, and the said angularly directed portion being provided with a sharp edge portion adapted to co-operate with the sharp edge portion of the foot; there being a spur member upon said angularly directed portion opposite the sharp edge portion.

3. A device of the character described, comprising two relatively movable members, one of said movable members being a handle provided with a foot and the other of said movable members being a pivoted dog carried by said handle and adapted to co-operate with the foot; said pivoted dog comprising two spaced parallel members joined by a transverse member at one end thereof, said parallel members having a pivotal connection with the handle member, said transverse member being adapted to co-operate with the foot portion of the handle; said transverse member having an angular relation to the end of the parallel member, and the foot member being correspondingly angled with relation to the handle member.

4. A device of the character described, comprising two relatively movable members, one of said movable members being a handle provided with a foot and the other of said movable members being a pivoted dog carried by said handle and adapted to co-operate with the foot; said pivoted dog comprising two spaced parallel members joined by a transverse member at one end thereof, said parallel members having a pivotal connection with the handle member, said transverse member being adapted to co-operate with the foot portion of the handle; said transverse member having an angular relation to the end of the parallel member, and the foot member being correspondingly angled with relation to the handle member; said foot member being dovetailed and provided with a correspondingly dovetailed sharpened plate member carried within said dovetailed portion.

5. A device of the character described, comprising two relatively movable members, one of said movable members being a handle provided with a foot and the other of said movable members being a pivoted dog carried by said handle and adapted to co-operate with the foot; said pivoted dog comprising a member formed with an angularly directed portion, said angularly directed portion being adapted to co-operate with the foot of the handle; said foot of the handle being provided with a sharp edge member, and the said angularly directed portion being provided with a sharp edge portion adapted to co-operate with the sharp edge portion of the foot; said foot being provided with a toe member opposite the sharp-edge portion, whereby when the sharp edge portions of the foot and the dog member engage an object, the handle member may oscillate upon the toe member.

6. A device of the character described, comprising a handle provided with a foot and a dog pivoted to the handle and adapted to co-operate with the foot; said dog and foot being so related that the foot and dog may be so swung in one direction as to advance the device step by step, and a swinging of the dog in the opposite direction permitting an edge of the foot and an edge of the dog to cooperate.

In testimony whereof, I have signed my name to this specification in the presence of two subscribing witnesses.

CHARLES F. JACOBS.

Witnesses:
 C. W. WARNER,
 Mrs. GYPSY M. JACOBS.